Sept. 6, 1960   H. J. ACKERMAN   2,951,726
END GATE FOR A WAGON BOX
Filed June 30, 1958   2 Sheets-Sheet 1

INVENTOR.
HARRY J. ACKERMAN
BY

Sept. 6, 1960

H. J. ACKERMAN 2,951,726

END GATE FOR A WAGON BOX

Filed June 30, 1958

INVENTOR.
HARRY J. ACKERMAN
BY
Charles L. Lovenbeck
attorney

United States Patent Office
2,951,726
Patented Sept. 6, 1960

2,951,726

END GATE FOR A WAGON BOX

Harry J. Ackerman, Reinbeck, Iowa

Filed June 30, 1958, Ser. No. 745,742

4 Claims. (Cl. 296—51)

This invention relates to vehicles and, more particularly, to boxes and containers and end gates therefor for the type of wagon or vehicle commonly known as the common trailer type four wheeled farm wagon.

In wagon boxes of this type which are used for hauling grain and wherein the grain is dumped from the wagon box by elevating the front wheels of the wagon, it has always been a problem to provide an end gate whereby the grain, especially eared corn and bulky grains, can be emptied from the wagon box at a controlled rate. It is difficult sometimes to start the grain coming out from the wagon box when only a small opening is made in the rear end of the wagon and, after the grain starts to flow, it is difficult to regulate the rate of flow. Further, wagon boxes for holding grain are often subjected to considerable stresses and strains and, therefore, it is desirable and even necessary to have a very strong rigid wagon box construction.

With the above and other problems in view, it is an object of this invention to provide a wagon box and, more particularly, it is an object to provide a wagon box which is simple in construction, economical to manufacture, and simple and efficient in operation.

Another object of the invention is to provide an improved structure and arrangement of parts in a wagon box according to the invention.

A further object of this invention is to provide an improved end gate for a wagon box.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
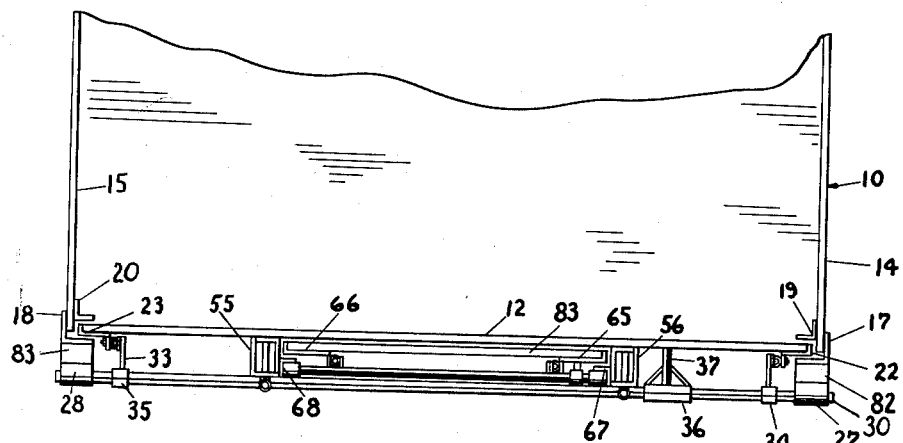
Fig. 1 is a top view of an end gate according to the invention.
Figure 2:
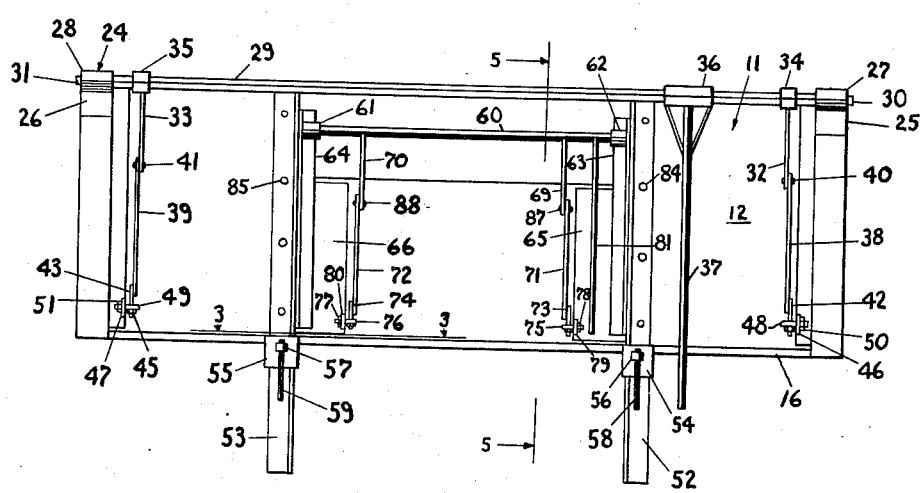
Fig. 2 is an end view of the end gate in place in a wagon.
Figure 3:
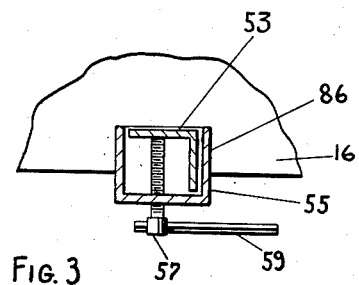
Fig. 3 is a cross sectional view taken on line 3—3 of Fig. 2.
Figures 6, 7:
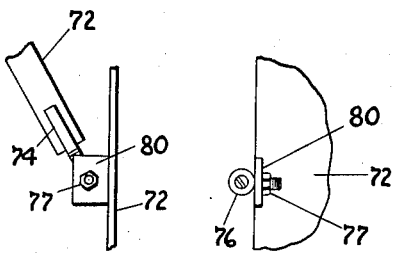
Fig. 6 is an enlarged broken view of a connector of the linkage.
Fig. 7 is a view similar to Fig. 6 of another view of the part shown in Fig. 6.

Now with more specific reference to the drawing, a wagon box 10 is shown having an end gate 11 with an end gate board 12 vertically slidable up and down in the wagon box 10 to provide an opening between the board 12 and the bottom 16. The wagon box 10 has side boards 14 and 15 attached to the bottom 16 in the usual manner to provide a container. The sides 14 and 15, end gate board 12 and bottom 16 will preferably be made of wood in order for the box 10 to be light in weight.

The end gate board 12 is arranged to slide vertically between inner cleats 19 and 20 which are in the form of an angle as shown having one flange thereof attached to the inside surface of the corresponding side board 14 and 15. Outer cleats 17 and 18 each have one flange thereof attached to the outer side of the wagon box sides 14 and 15 as shown with the inner leg of the cleats 17 and 18 spaced from the flanges of the cleats 19 and 20 to receive the ends of the end gate board 12.

Wear plates 22 and 23 are in the form of angle irons and have one flange thereof overlying the side of the end gate board 12 and the other flange thereof extending around the edge. The wear plates 22 and 23 are fixed to the end gate board 12 so that when the grain in the wagon box 10 engages the inside surface of the end gate, the wear plates 22 and 23 will be forced against and will slide against the laterally extending flange of the outer cleats 17 and 18 and prevent wear thereon. The wear plates 22 and 23 can be lubricated to facilitate movement of the end gate up and down. The end gate board 12 will slide up and down freely between the inner cleat angle flange and the outer cleat angle flange when no load is in the wagon and when a load of grain is in the wagon box 10, the wear plates 22 and 23 will engage the outer cleats 17 and 18 and prevent wear on the end gate board 12 itself.

Figure 4:
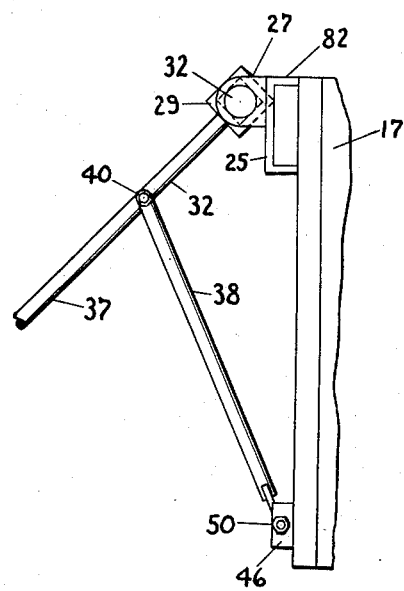
Fig. 4 is a side view of the actuating mechanism for the wagon box.
Figure 5:
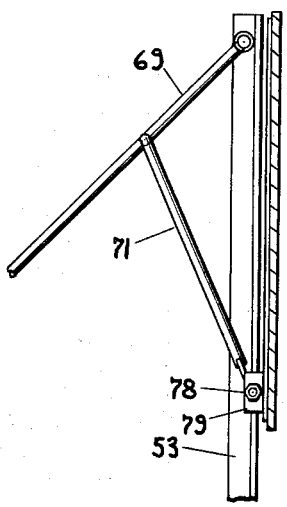
Fig. 5 is a cross sectional view taken on line 5—5 of Fig. 2.

In order to raise or lower the end gate board 12 efficiently, a lifting mechanism is provided. This lifting mechanism is made up of the square rod 29 which extends laterally of the wagon box and has rounded journal like ends 30 and 31 which are received in round rod receiving bearing members 27 and 28. The round rod receiving members 27 and 28 have ears 25 and 26 which are welded or attached by other suitable fastening means to a section of channel 82 and another section 83 at the opposite side of the wagon as best shown in Fig. 4. Links 32 and 33 have sockets 34 and 35 integrally attached thereto. The sockets 34 and 35 have a square opening therethrough which slidably receives the square rod 29. The distal ends of the links 32 and 33 are pivotally attached to links 38 and 39, respectively, by pivot pins 40 and 41.

A handle 37 has a socket rod receiving portion 36 which slidably engages the square rod 29 and allows an operator to grasp the handle 37 to rotate the rod 39 to swing the links 32 and 33 with the rod 29 and, thereby, through the links 38 and 39 lift the end gate. The handle 37 can be slid to either side for convenience of operation. The lower ends of the links 38 and 39 are attached to the end gate by means of threaded round members 42 and 43 which are welded to the links 38 and 39. The threaded round members 42 and 43 extend through holes in eye members 48 and 49 and are secured thereto by means of nuts 44 and 45. The eye members 48 and 49 have threaded portions extending through lugs 46 and 47 and may be locked to the lugs 46 and 47 by means of nuts 50 and 51 to lock the end gate in any position since when the nuts 50 and 51 are tightened, the eye members 48 and 49 can not rotate and, therefore, the end gate may be locked in a predetermined position. The lugs 46 and 47 are welded to the wear plates 22 and 23.

Angular shaped guide members 52 and 53 have their upper ends fixed to the end gate 12 by means of bolts or the like indicated at 84 and 85. The lower ends of the angle members 52 and 53 extend below the end gate and are received in sockets 54 and 55 which are made up of channel shaped members situated in notches 86 in the bottom 16 of the wagon box 10 and the angular guide members 52 and 53 extend therethrough. Stop screws 56 and 57 are threadably received in threaded holes in the sockets 54 and 55 and handles 58 and 59 are attached to the stop screws 56 and 57 for convenience in rotating. Therefore, when the stop screws 56 and 57 are rotated to loosen them, the guide members 52 and 53 may slide upwardly and downwardly very freely and, with them, the end gate. When the stop screws 56 and 57 are locked by tightening them, the end gate will be locked in position.

A guide rod 60 is likewise supported in bearings 61 and 62 and rotatably received therein. Links 69 and 70 are welded to the rod 60 at one end and are pivotally attached to links 71 and 72 at the other end by bolts 87 and 88. The lower ends of the links 71 and 72 are welded to threaded members 73 and 74 and the threaded members 73 and 74 extend through eye members 75 and 76 and are locked thereto. The eye members 75 and 76 extend through lugs 79 and 80 and are locked thereto by means of nuts 77 and 78. The nuts 77 and 78 may be loosened so that the links 71 and 72 may swing freely and, therefore, when a handle 81 which is welded to the rod 60 is rotated, the links 71 and 72 will be pulled upwardly and swing with the eye members 75 and 76 to raise the small end gate or channel section 83. This end gate can be locked in position by tightening the nuts 77 and 78. To raise the small end gate, it is merely necessary to loosen the nuts 77 and 78 and rotate the handle 81 to swing it with the rod 60 and, thereby, cause the end gate 83 to slide upwardly.

The end gate 83 is slidably received between the end gate board 12 and the angles 67 and 68. The angles 67 and 68 form cleats which have one flange thereof attached to the outwardly extending flange on the angle guide members 52 and 53, the other flange extending laterally to form a cleat spaced from the one end gate board 12 to receive the small end gate 83. Wear plates 65 and 66 are attached to the end gate board 12 by means of one flange and the other end flange extends around the end of the end gate, thus providing a metal to metal sliding surface between the wear plates 65 and 66 and the angles 67 and 68. This surface can likewise be lubricated to facilitate the movement of the small end gate.

To lift the small gate 83, the operator will pull back and upward on the handle 37 which will rotate the links 69 and 70 to pull the links 71 and 72 upward. This will cause the gate 83 to slide upwardly. To lock the gate 83 in any position, the operator may tighten the nuts 77 and 78.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination, a wagon box having two sides, a bottom, and an open end, an end gate for said open end, means to support said end gate across said open end of said box, said means comprising outer cleats and inner cleats defining a space for said end gate to slide therebetween, a square rod, the ends of said square rod being round and received in bearing members, said bearing members being attached to a flange of a first angle iron by means of a channel iron, a first link having a member non-rotatably supported on said square rod and extending therefrom and pivotally connected at its distal end to a second link said second link having the end opposite said pivotal connection attached to an eyelet member, said eyelet member extending through an opening in a lug member attached to a wear plate, and nut means for locking said eyelet member to said lug member whereby said eyelet member is non-rotatably attached to said lug member and said end gate is locked against upward and downward movement.

2. The combination recited in claim 1 wherein spaced third angle irons are attached to said end gate and have an end portion extending downwardly therefrom, socket members are attached to said wagon box bottom for slidably receiving said downwardly extended end of said third angle irons, and threaded members extend through said socket members and engage said third angle irons for locking said third angle irons and said end gate attached thereto against vertical sliding movement.

3. The combination recited in claim 2 wherein a handle member is provided, said handle member having a portion complementary in shape to said square rod and slidably supported thereon whereby said square rod can be rotated.

4. In combination, a wagon box having two sides, a bottom, and an open end, an end gate for said open end, means to support said end gate across said open end of said box, said means comprising outer cleats and inner cleats defining a space for said end gate to slide therebetween, said outer cleats each comprising an angle iron having one flange thereof attached to the outer surface of one said side with the other flange thereof extending parallel to said end gate and overlying an end thereof, said inner cleats comprising second angle irons, said second angle irons each having one flange thereof attached to the inner surface of one of said sides and another flange thereof extending parallel to said second flange of said first angle irons and disposed in spaced parallel relation thereto with the end of said end gate received therebetween, a wear plate disposed on said end gate and betwen said end gate and said second flange of said first angle irons, means for moving said end gate up and down between said cleats, said moving means comprising a square rod, the ends of said square rod being rounded and received in bearing members, said bearing members being attached to said second flange of said first angle irons by means of a channel iron, a first link having a member non-rotatably supported on said square rod and extending therefrom and pivotally connected at its distal end to a second link, said second link having the end opposite said pivotal connection attached to an eyelet member, said eyelet member extending through an opening in a lug attached to said wear plate, nut means for locking said eyelet member to said lug whereby said eyelet member is non-rotatably attached to said lug and said end gate is locked against upward and downward movement, spaced third angle irons attached to said end gate and having an end portion extending downwardly therefrom, socket members attached to said wagon box bottom for slidably receiving said downwardly extending end portion of said third angle irons, threaded members extending through said socket members and engaging said third angle irons for locking said third angle irons and said end gate attached thereto against vertical sliding movement, an opening in said bottom of said box adjacent the central lower part of said end gate betwen said third angle irons, fourth angle irons, one disposed on each side of said opening in said gate, said fourth angle irons having one flange thereof attached to the flange of said third angle irons on the side thereof adjacent the other flange of said fourth angle irons and the other flange of said fourth angle irons extending perpendicular thereto defining a space between said second flange of said fourth angle irons and said end gate, a second end gate supported betwen said second flange of said fourth angle irons, and means to slidably move said second end gate betwen said flanges of said third and fourth angle irons to open and to close said second end gate.

References Cited in the file of this patent

UNITED STATES PATENTS

| | | |
|---|---|---|
| 290,374 | Ware | Dec. 18, 1883 |
| 1,022,266 | Saltzman et al. | Apr. 2, 1912 |
| 1,322,122 | Landis | Nov. 18, 1919 |
| 1,394,798 | Speed | Oct. 25, 1921 |
| 2,635,688 | Bruning | Apr. 21, 1953 |
| 2,732,252 | Stekelenburg | Jan. 24, 1956 |
| 2,745,696 | Weatherly | May 15, 1956 |